Patented Jan. 9, 1923.

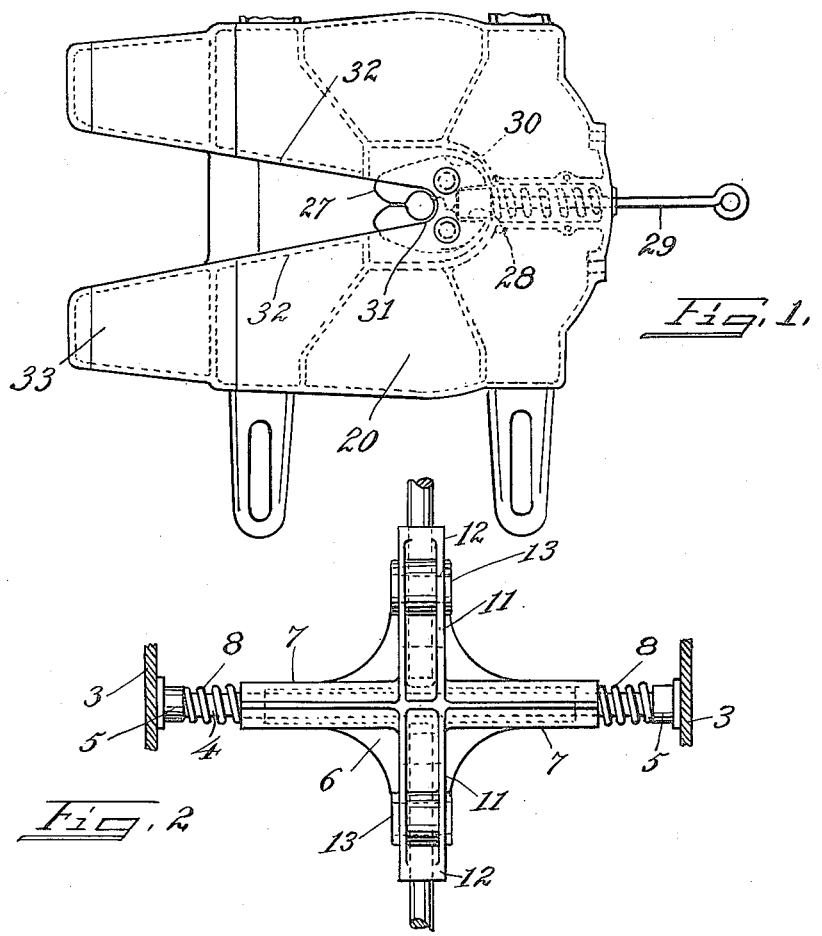

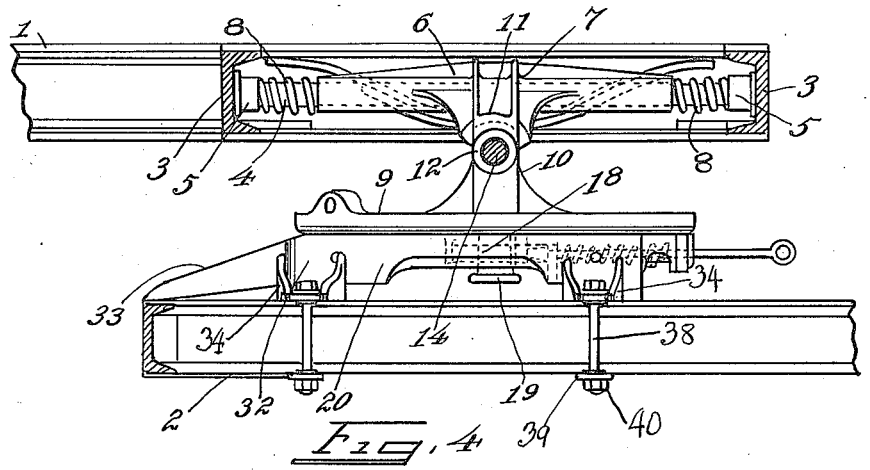
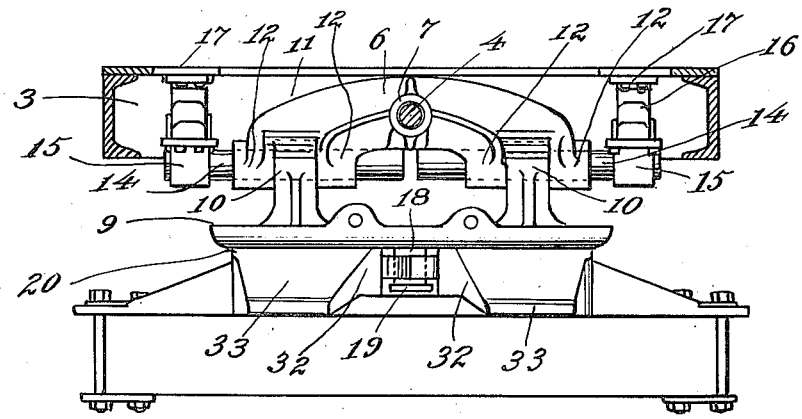
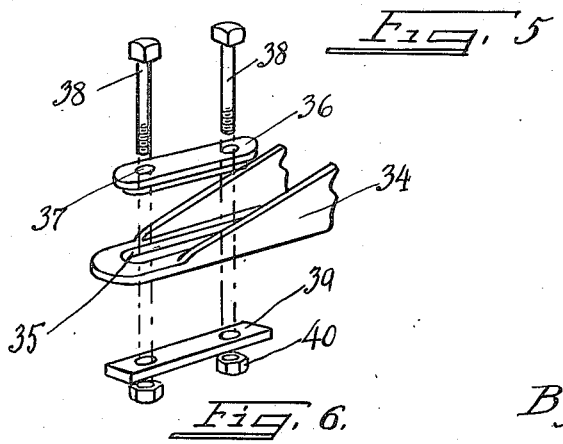

1,441,292

UNITED STATES PATENT OFFICE.

JAMES MORRISON, OF CINCINNATI, OHIO, ASSIGNOR TO THE TRAILMOBLE COMPANY, OF CINCINNATI, OHIO, A CORPORATION OF OHIO.

SEMITRAILER.

Application filed December 19, 1919. Serial No. 346,057.

*To all whom it may concern:*

Be it known that I, JAMES MORRISON, a citizen of the United States, and a resident of the city of Cincinnati, in the county of Hamilton and State of Ohio, have invented certain new and useful Improvements in Semitrailers, of which the following is a full, clear, and accurate description, reference being had to the drawings forming a part of this specification.

My invention relates particularly to semi-trailers, wherein there are a tractor and trailer vehicle, with the forward end of the trailer vehicle supported on the rear end of the tractor. It would also have other applications evident to those skilled in the art.

As so far developed in semi-trailers, of the type above mentioned, there have been defects in operation which have tended to restrict the amount of use to which the devices have been put. For economical hauling from the point of view of immensely increasing the working time of tractor means while at the same time increasing possible loads, and simplifying the problems of loading and unloading, the semi-trailer type of vehicle possesses great advantages. Its drawbacks have been the work of coupling the tractor and trailer, and the construction of a fifth wheel device intermediate the two parts which will take care of the necessary movements and strains involved in the complete mechanism.

It is my object in this invention to provide for both facility in automatic coupling, allowing for a complete guiding of parts to compensate for mis-adjustment of the two vehicles, and for adequate resilience of support for the trailer vehicle, so as to permit a full steering and backing range for the tractor and trailer as a unit. Among other things I have discovered that to gain proper freedom of movement for the trailer, all journals or universal joints in the fifth wheel should be applied to the trailer rather than in whole or in part to the tractor, and I have simplified and materially strengthened the fifth wheel over any device of which I have knowledge in the prior art.

The above objects and other advantages I accomplish by that certain construction and arrangement of parts to be hereinafter more specifically pointed out and claimed.

In the drawings,

Figure 1 is a top plan view of the tractor plate or rigid fifth wheel member.

Figure 2 is a top plan view of the suspended spider mounted on the under side of the trailer.

Figure 3 is a top plan view of the fifth wheel member suspended from the spider shown in Figure 2.

Figure 4 is a side elevation of the assembled fifth wheel.

Figure 5 is a front elevation of the parts shown in Figure 4.

Figure 6 is a detail perspective of the bolster mounting device.

In connection with my invention I employ the coupler elements set forth and described in the application for patent of John C. Endebrock, filed October 24, 1919, Serial No. 332,995, and accordingly, except as an element in my combination, the specific form of coupler forms no part of my invention herein.

It will be noted particularly that the fifth wheel device comprises a rigid member for the tractor, with a universally suspended set of devices on the under side of the trailer.

To make this clear, I will suppose an instance of a semi-trailer assembly having a laterally pivoted fifth wheel member on the tractor element. Suppose it is necessary to back the trailer element in such a device up over a slanting curb. The driver will turn the front wheels of the tractor causing the trailer body to swing around until the central line thereof is at a considerable angle to line of the tractor. When this is done the lateral pivot for the tractor fifth wheel lies almost longitudinally of the trailer, and all its lateral pivoting function is completely lost so far as the trailer is concerned. When the driver then attempts to back the trailer up over a slanting curb he will be unable to do so, because the trailer can no longer tip lengthwise with relation to the tractor.

According to my invention, however, the longitudinal and lateral pivots for the trailer are mounted on the trailer alone; and thus remain in a constant relation to the trailer and its load.

The trailer frame has been indicated at 1, and the tractor frame at 2. As in all semitrailers, the forward end of the trailer frame is supported on the rear end of the tractor frame by means of a fifth wheel.

Set between cross members 3, 3, of the trailer frame is a rigid shaft 4, there being suitable sockets 5 to receive its ends. On this shaft or bar 4 is slidably suspended a four armed spider 6, which has a longitudinal sleeve 7 for mounting and journalling over the shaft 4. Spiral springs 8, 8, at each end of the bar 4 bear between the sockets 5 and the arms or sleeve 7, thereby taking up shocks attendant upon sliding movement of the spider on the bar or shaft.

The sliding journal above described is longitudinal of the trailer vehicle and the springs take up jars incident to stopping and starting of the device and road inequalities.

The fifth wheel plate 9, for the trailer is of the accepted circular form, and carries on its upper face a pair of journal bosses 10. The spider has two laterally extending arms 11, 11, from which depend on each side thereof a pair of bosses 12, 12.

The spaces 13 between the bosses on the spider permit the bosses of the fifth wheel to be inserted therein, and the combined row of bosses forms a journal for stub shafts 14, 14, which are inserted through them.

By the above described mechanism the fifth wheel plate of the trailer vehicle is suspended on a journal laterally of the trailer frame, while the spider is journalled longitudinally of said frame. There is slidability for the spider but not for the fifth wheel plate and in neither instance does the spider or the fifth wheel plate find a support on some member located outside of their outer dimension or periphery.

In some devices of the prior art it has been the custom to extend the trailer fifth wheel laterally and slidably to support these extensions in the trailer frame. It will be noted that I do not do this, but in each instance suspend the spider and wheel from what might be termed upward extensions, thereby materially strengthening the structure of these parts.

In order to take up the tilting motion of the trailer on the tractor, I preferably provide the stub shafts with spring retaining shoes 15 and in the shoes place elliptical springs 16 which bear on corner plates 17 mounted in the trailer frame, there are cross members to serve as mounting for the supporting bar or shaft of the spider. It is to the corners formed between the normal frame members and the cross members that the above noted corner plates are secured.

From the trailer fifth wheel plate depends a preferably integral post or king pin member 18, which is employed in coupling the said plate to the tractor fifth wheel plate.

On the tractor it will be noted that the fifth wheel member is securely bolted to the frame, and serves as a mounting for a coupler that engages automatically above the flange 19 of the pin 18.

This tractor plate 20 has its main body portion of a size to serve as a plane surface against which the fifth wheel plate of the trailer can bear. Supported inside of the casting of this plate 20 are a pair of pivoted jaws 27 of special conformation, which when closed will form an annular engagement about the depending post or king pin on the fifth wheel plate of the trailer.

The jaws have also rearwardly extending members 30 which are spread by a spring plunger 28, thereby preventing the opening up of the annular engagement about the king pin, until the plunger is withdrawn by means of the operating rod 29. This rod is to be worked from the tractor vehicle, and when withdrawn from the jaws permitting them to open, and then released, it will rest against the ends of the members 30 and retain the jaws open until the depending king pin is again brought against a nib 31 on the jaws thereby closing them for a new engagement.

The plate 20 is formed with an opening therein, extending from an apex at the point of engagement of the jaws, and thence tapering outwardly to the desired angle. As the depending king pin of the trailer device approaches the plate 20, it will be guided toward the center thereof, by means of the tapering sides of this opening, thereby insuring a proper coupling.

The arms 32, forming the sides of this opening are also tapered downwardly at the rearward end as at 33, beginning at about the line of the plane surface of the plate 20 required for contact with the upper fifth wheel member.

When a coupling is taking place and the trailer is not quite high enough to seat its fifth wheel plate readily on the tractor, then this latter plate being free to tip, will ride up on the sloping surface 33 of the arms 32, thereby elevating the trailer to a proper position.

It will be preferable to locate the means of supporting the front end of the trailer vehicle when uncoupled from the tractor, at such a height that a slight elevation of the trailer vehicle will be accomplished in coupling. Such a slight elevation will naturally free from supporting strain the jacks, horses, or what not that are employed to prop up the front end of the trailer, when the tractor is removed and thus facilitate the moving of them out of the way.

The fifth wheel member for the trailer is suspended on a pivot running laterally of the trailer, and the spider that suspends this plate is itself supported both slidably and pivotally in a longitudinal relation to the vehicle. This is a strong construction which permits a sliding motion of the fifth wheel plate with relation to the trailer vehicle, as well as a tilting motion in two directions at right angles to each other. Since the spider and plate are both mounted on the trailer, the pivotal relation of the trailer support on the tractor always remains in the same position to the trailer and its load, independent of the turning of the tractor.

The advantages of this universal support coupled directly to the trailer vehicle have been hitherto pointed out.

As a convenient way of mounting the bolster plate upon the tractor vehicle, I provide the following, which has a number of advantages, over any mounting with which I am familiar.

On the bolster plate are formed a set of ears 34, which are of sufficient width and sufficiently spaced apart cross-wise of the bolster plate to accommodate probable variations in width of the tractor frames to which the bolster is to be attached.

In the ears are formed long slots 35, of greater width than will be the channel bar flanges in any ordinary tractor frame. Plugs 36 are provided to fit within the ears, and formed on their underside to fit into and fill up the space of the slots.

In mounting the bolster, it is set on the desired frame, and the plugs set in place in the slots. The plugs are then marked for holes, one on each side of the channel bars, and holes 37 formed in any desired manner. In these holes are set suitable bolts 38, 38, one through each hole, and a cross plate 39 mounted over the bolt ends beneath the channel bars, after which the nuts 40 are turned down on the bolts, thereby clamping the bolster firmly in place.

The channel bars are not perforated with holes, with the consequent weakening of them, and variations in width of frame can be accommodated by a standard arrangement, the adjustments being made at the time of mounting by properly positioning the holes in the plug elements.

I do not wish in the claims that follow to be limited beyond the ordinary application of the doctrine of equivalents, because of a failure on my part to point out in the above description the various modifications which might well be substituted by any skilled mechanic for those described in detail by me.

Having thus described my invention, what I claim as new and desire to secure by Letters Patent is:—

1. In a device of the character described, mechanism for mounting a fifth wheel plate on a trailer vehicle comprising a longitudinal member slidably and tiltably mounted on the vehicle, and lateral members extending therefrom, a fifth wheel plate, said fifth wheel plate being tiltably journalled to said lateral members and spring means acting between said lateral members and the trailer vehicle, and between the longitudinal member and the trailer vehicle.

2. In a device of the character described, a mechanism for mounting a fifth wheel plate on a trailer vehicle comprising a rigid shaft disposed longitudinally of the vehicle, a spider suspended slidably on said shaft, and a fifth wheel plate suspended on said spider on a line at right angles from the rigid shaft.

3. In a device of the character described the combination with a trailer vehicle of a spider, means for suspending said spider slidably and longitudinally of the vehicle, a pair of stub shafts supported in said spider, a fifth wheel plate and means for suspending said fifth wheel plate from said stub shafts.

4. In a device of the character described the combination with a trailer vehicle of a spider, means for suspending said spider slidably and longitudinally of the vehicle a pair of stub shafts supported in said spider, a fifth wheel plate and means for suspending said fifth wheel plate from said stub shafts, and spring means interposed between the stub shafts and the trailer vehicle for the purpose described.

5. In a device of the character described the combination with a trailer vehicle of a spider, means for suspending said spider slidably and longitudinally of the vehicle a pair of stub shafts supported in said spider, a fifth wheel plate and means for suspending said fifth wheel plate from said stub shafts, and spring means interposed between said spider and the vehicle to take up the slidable play, and additional spring means interposed between the stub shafts and the vehicle to take up tiltable play.

6. In a device of the character described, mechanism for mounting a fifth wheel plate, on a trailer vehicle comprising a longitudinal member slidably and tiltably mounted on the vehicle, and lateral members extending therefrom, a fifth wheel plate, said fifth wheel plate being journalled to said lateral members.

7. In a semi-trailer, the combination with a tractor and trailer of a fifth wheel member non-revolubly suspended with a universal joint connection from the trailer, a bearing member on the truck to form a plane surface against which said fifth wheel bears, a king pin element for said fifth wheel and bearing member, and an inclined member leading to the bearing member and adapted to elevate said fifth wheel to the plane surface of said bearing member.

JAMES MORRISON.